United States Patent [19]
Hall et al.

[11] Patent Number: 5,787,180
[45] Date of Patent: Jul. 28, 1998

[54] METHOD OF CONNECTING A SCRAMBLER OR ENCRYPTION DEVICE TO A HAND-HELD PORTABLE CELLULAR TELEPHONE

[75] Inventors: Christopher A. Hall, Lancaster County; James R. Holthaus, Douglas County; Bradley A. Riensche, Lancaster County, all of Nebr.

[73] Assignee: Transcrypt International, Inc., Lincoln, Nebr.

[21] Appl. No.: 826,083

[22] Filed: Mar. 24, 1997

[51] Int. Cl.[6] .................................................. H04L 9/00
[52] U.S. Cl. ............................ 380/52; 380/6; 380/8; 380/9; 380/33; 380/49
[58] Field of Search ........................ 380/6, 8, 9, 33, 380/46, 49, 59, 52

[56] References Cited

U.S. PATENT DOCUMENTS

| | | |
|---|---|---|
| Re. 34,034 | 8/1992 | O'Sullivan . |
| 3,651,268 | 3/1972 | Rivkin .................................. 380/6 |
| 3,686,571 | 8/1972 | Fathauer ............................... 380/9 |
| 3,718,765 | 2/1973 | Halaby ................................. 380/6 |
| 4,747,137 | 5/1988 | Matsunaga ........................... 380/6 |
| 5,301,223 | 4/1994 | Amadon et al. . |
| 5,307,370 | 4/1994 | Eness . |
| 5,506,889 | 4/1996 | Gustafson et al. . |
| 5,535,277 | 7/1996 | Shibata et al. . |
| 5,568,553 | 10/1996 | Takahashi et al. . |

Primary Examiner—Bernarr E. Gregory
Attorney, Agent, or Firm—Zarley, McKee, Thomte, Voorhees, & Sease

[57] ABSTRACT

An apparatus and method for voice privacy for cellular phones includes generic connection points to make it universal for most cellular phones. The connection points include the speaker and microphone and the microphone input and speaker output of the cellular phone. A scrambling or encryption circuit or process is used to secure the audio before it is transmitted over the network, and the unsecured audio once received. Side-tone added by the cellular phone and network echo of the scrambled audio to be transmitted is removed by, for example, adaptive echo cancellation, and unscrambled side-tone is presented to the speaker. The apparatus can be implemented in a digital signal processor.

28 Claims, 2 Drawing Sheets

METHOD OF CONNECTING A SCRAMBLER OR ENCRYPTION DEVICE TO A HAND-HELD PORTABLE CELLULAR TELEPHONE

BACKGROUND OF THE INVENTION

1. Field of the Invention

The invention relates to cellular telephones and scrambling or encryption of cellular telephone communications, and in particular, to an apparatus and method to connect and operate a scrambler or encryption device to a cellular telephone.

2. Problems in the Art

Cellular telephone use today is almost ubiquitous. Unknown less than ten years ago, it is now a common way to communicate between remote locations. The primary advantage is the ability to be wireless, and thus totally mobile.

To achieve this mobility advantage over conventional telephones (which must usually ultimately be based on wire transmissions) radio energy is utilized as the mode of transmission. The use of radio energy, however, brings into play the problem of privacy. Cellular systems rely on transmission towers spatially placed in basically a geographical grid. Cellular users must be in the grid to communicate. Transmissions between cellular phones are accomplished by utilizing the network of towers across the grid. Towers nearest to a cellular phone receive and pass communications from and to that phone. The same is true for the other phone. Thus, cellular communications are essentially broadcast over a substantial area.

Although attempts have been made to deter persons other than those intended to be involved in the communication from intercepting the same, it is relatively easy to do so. Furthermore, there are competing interests at play with respect to whether broadcast communications can or can not be legally intercepted and monitored. Still further, even if illegal, it is extremely difficult to catch such interlopers.

Therefore, a real need in the art exists for making cellular communications secure, or to deter eavesdropping. Attempts have been made to encrypt the cellular transmissions. Some examples are discussed below.

U.S. Pat. No. 5,524,134 to Gustafson et. al. discloses a method of connecting an encryption device which consists of two processors and an encryption engine. This disclosure shows a single digital signal processor (DSP) which performs the scrambling or encryption where the scrambling or encryption is necessarily performed in the DSP.

U.S. Pat. No. 5,410,599 to Crowley et. al. discloses an encryption system for communications over normal telephone lines, private switched telephone networks or cellular telephones. Only general mention of connection to unmodified telephone equipment is made.

U.S. Pat. No. 3,114,800 to Simpkins discloses a method of acoustically coupling a coding device to a telephone handset.

U.S. Pat. No. 5,455,861 to Faucher et. al discloses a method of connecting an encryption device between the base and handset of a telephone.

Although the general concept of addressing security in cellular communications systems by using encryption is known, there remains certain problems and deficiencies in the art. For example, there is no known disclosure of a universal after-market add-on for cellular phones. It would be beneficial to have one device which could be inserted and operated in almost any cellular phone.

There is no disclosure of a device that would be adaptable to communications security by either scrambling or encryption. Again, it would be beneficial to have one device that could be configured to provide either type of security.

There is no disclosure which effectively deals with echo in scrambled or encrypted systems. Cellular phones, as with conventional phones, normally feedback the voice of the person speaking to that person while he/she is talking. This is called side-tone, such as is known in the art. Also there are other echo problems, such as are known in the art, that usually stem from reflections of the near end audio in the communications network. Such side-tone and echoes, both sometimes referred to as echoes, can be disruptive. This is particularly true if a scrambler or encryptor is added between the handset (microphone and speaker) and the phone circuit. The phone circuit will generate a side-tone, but it will be scrambled or encrypted. Therefore, feedback to the handset speaker would be very disruptive to the person speaking because it must be de-scrambled before being presented to the person.

Therefore, there is a real need in the art and it is a primary object of the present invention to provide an apparatus and method of providing encryption or scrambling to cellular telephones that improves over or solves the problems and deficiencies in the art.

Other objects of the present invention include provision of an apparatus and method which:

1. is compatible with almost every cellular phone on the market today;
2. connects to cellular phones in a convenient and easy manner that should continue to make it compatible with most present and future cellular phones;
3. is flexible in its ability to be implemented as an encryption or scrambler system;
4. effectively deals with echo, such as that related to side-tone or network created echo;
5. can be incorporated into a single device using a single DSP;
6. is economical, efficient and durable.

These and other objects, features, and advantages of the present invention will become more apparent with reference to the accompanying specification and claims.

SUMMARY OF THE INVENTION

The present invention relates to an apparatus and method for providing voice privacy for cellular telephones. The apparatus includes a circuit module that is insertable into cellular phones at easily ascertainable and generic connection points, namely between microphone and microphone input to the phone circuit of the cellular phone, and between the speaker output of the phone circuit and the speaker of the cellular phone. The module includes a voice privacy component, for example, in the form of a scrambler or encryptor. The module can be implemented with a digital signal processor, including necessary analog to digital and digital to analog converters.

According to another aspect of the apparatus according to the invention, any near end audio echoes in the form of side-tone generated by the cellular telephone phone circuit or caused by reflections in the network can be removed by adaptive echo cancellation. Scrambled or encrypted near end audio would be compared with the signal coming from the speaker output. If any near end audio is identified, it is removed. Thus, side-tone generated by the phone circuit and reflections of the near end audio in the network are removed, leaving only the scrambled or encrypted far end audio to be de-scrambled or decrypted and passed to the speaker. If side-tone is desired at the speaker, it can be taken directly from the near end audio before it is scrambled or encrypted by the module.

The method according to the invention intercepts the microphone input and the speaker output of the conventional cellular phone. The microphone input, normally unsecured audio, is secured by scrambling or encryption, for example. Conversely, the speaker output, normally receiving unsecured audio but now receiving secured (e.g. scrambled or encrypted) audio, is recovered in an unsecured form (de-scrambled or decrypted) and passed to the speaker. If side-tone is generated by the cellular phone, or if network echo exits, it can be eliminated by adaptive echo cancellation.

DETAILED DESCRIPTION OF PREFERRED EMBODIMENTS

Overview

Figure 1:
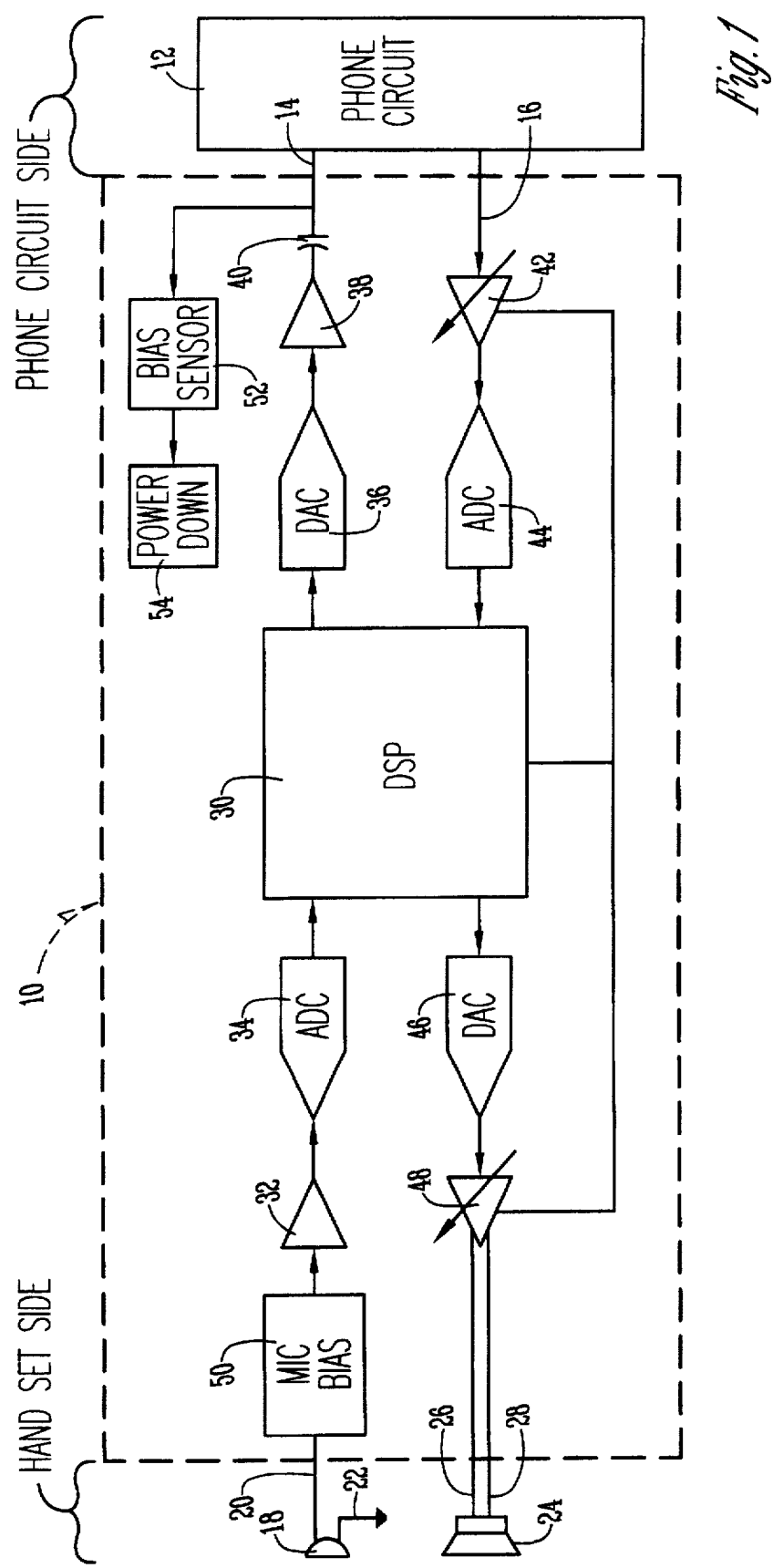
FIG. 1 is a block diagram of a circuit according to a preferred embodiment of the present invention.

To assist in a better understanding of the invention, a description of one embodiment or form the invention can take will now be set forth in detail. Frequent reference will be taken to the drawings. Reference numbers will sometimes be utilized to indicate certain parts or locations in the drawings. The same reference numbers will be used to indicate the same parts and locations throughout the drawings unless otherwise indicated.

In this description, a single cellular telephone circuit with an add-on circuit according to the present invention will be shown. However, the description will be in the context, of course, of two-way duplexed voice communications between two cellular telephones in a conventional cellular telephone system. In this example, one phone will be discussed as if it were being used by the reader. The other will be used by a second person at a remote location in the cellular network. Therefore, to distinguish between the two phones, the reader's phone and the signals associated with it will be prefaced by the word "near-side" or "near-end" and the remote phone and its signals by the word "far-side" or "far-end".

Structure of Preferred Embodiment

FIG. 1 portrays in block form a circuit 10 that can be connected between the cellular telephone circuitry 12 of a conventional cellular telephone, on the one hand, and the conventional microphone 18 and speaker 24 of the conventional cellular telephone, on the other hand. Circuit 10 therefore can be an after-market, retrofitted product into a wide variety of present cellular telephones, to provide voice security to conventional cellular phones not having such. As can be seen by FIG. 1, the connection of circuit 10 to cellular phone circuitry is at generic connection points that make installation easy and universal.

Circuit 10 scrambles both the near-side audio (usually speech) before it is transmitted over the cellular network and de-scrambles any far-side audio (usually speech) received from the network by the phone. Identical circuits 10 would need to be placed in any cellular phones that wish to communicate with each other.

Circuit 10 includes a digital signal processor (DSP) 30 with appropriate memory and power source. It has programming that includes the scrambling algorithm. Near-side speech into microphone 18 is converted to an analog signal, amplified by amp 32 and then converted to digital by analog-to-digital converter (ADC) 34, which passes the digital representation of the analog audio to DSP 30. Scrambling is accomplished and the scrambled near-side audio is passed through digital-to-analog converter (DAC) 36, amp 38 and capacitor 40 to microphone input 14 of the phone circuit 12, where the scrambled near-side audio can be transmitted as radio energy to the cellular network.

Circuit 10 includes variable amplifier 42 which takes the analog far-side audio signal from the speaker output of phone circuit 12, amplifies it and converts it into a digital representation at ADC 44, which passes its output to DSP 30. It is to be understood that the received audio would be scrambled, coming from the far-side or far-end cellular phone which would have a circuit 10 to scramble far-side audio prior to its transmission. Therefore, DSP 30 receives scrambled digitized audio from ADC 44, de-scrambles it and outputs a de-scrambled digitized representation of the far-side audio to DAC 46, where it is converted into an analog signal and then amplified by variable amplifier 48 in an appropriate manner to drive speaker 24. Speaker 24 therefore outputs unscrambled far-side audio at the speaker 24 of the near-side phone.

As such, the near-side phone can transmit and receive, in simultaneous form, both the near-side and far-side speech for duplex conversation between the users of the near-side and far-side phones. Both near-side and far-side speech is scrambled and thus secured against eavesdropping by conventional cellular phones or scanners while traveling the cellular network between phones, but with circuit 10 in each phone, received speech is de-scrambled at each phone so that it is intelligible to the authorized parties to the conversation.

FIG. 1 illustrates several optional features of circuit 10. An automatic gain control (AGC) can be used with variable amps 42 and 48 to control amplification of the signal ultimately driving speaker 24. Such AGC circuits are well known in the art. A microphone bias generation device 50 can be placed between microphone 18 and amp 32. It generates an appropriate microphone bias current for the particular type of microphone that comes with the conventional cellular phone (e.g. electret, dynamic, etc.) A microphone bias sensor element 52, connected as shown after capacitor 40, senses the existence or not of microphone bias current and issues a signal to what will be called "power down circuitry 54". Circuitry 54 will either supply full operational power to circuit 10 or will reduce power or go into a sleep mode depending on whether microphone bias is present. Thus these elements simply provide full power when near-side speech or audio is to be scrambled and transmitted, but when not, conserve power consumption of the generally battery-powered cellular phone. Examples of components 50, 52, and 54 are mic bias pull-up resistor, Schmitt trigger circuit, voltage regulator with power-down.

Circuit 10 can be placed on one circuit board of a size that can fit into, as an after-market product, almost any currently available cellular phone. Thus, it can be on the order of 30 mm by 50 mm by 2 mm in size.

An example of a cellular phone that could be used with circuit 10 is a Motorola brand Micro TAC. Below are pin connections that correspond with FIG. 1 for that phone.

| PIN | NAME | COMMENT |
| --- | --- | --- |
| 1 | Sw B+ | Power (on when phone is on) |
| 3 | RX in | from phone speaker output |
| 4 | RX out+ | to speaker |
| 5 | RX out− | to speaker |
| 6 | TX in | from mic |
| 7 | TX out | to phone mic input |
| 8 | LED out | to LED mode indicator |
| 10 | gnd | ground |

Circuit 10 will interface to the phone through the speaker and microphone.

Circuit 10 can be built around a Texas Instruments TMS320C56 DSP and a pair of Texas Instruments TCM320AC36 audio codecs (for DACs and ADCs 34, 36, 44, 46). The software program can be stored on an ATMEL 29LV256 parallel flash memory (not shown). When the TMS320C56 powers up, it will load its boot routine from the flash into the Internal RAM and then load the executable. A programmable logic device can be used to generate the clocks needed to operate the DSP and the codecs.

The cellular phone would function essentially the same as a conventional cellular phone (e.g. a Motorola Micro TAC) from a user's point of view. The scrambling could be enabled using a simple keypad activation sequence, such as "*0#". Where possible, the unit could use a LED indicator on the cellular phone to indicate the clear/coded state. If a LED is not available (i.e. Micro TAC phones with LCD display), some type of audio feedback could be devised similar to the above implementation, such as is within the skill of those skilled in the art.

Operation

Figure 2:
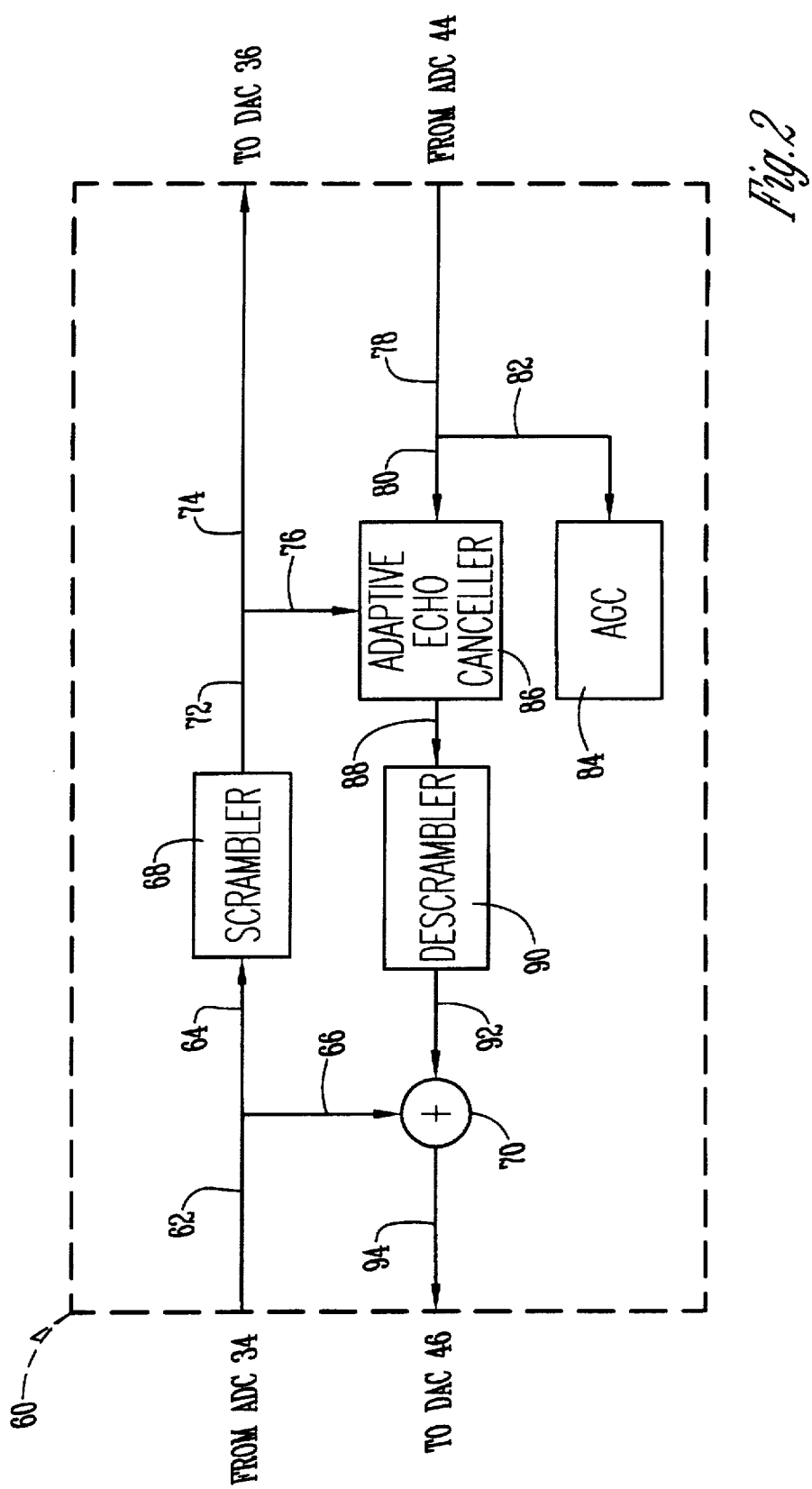
FIG. 2 is a diagrammatic depiction of the signal processing that occurs in the DSP of FIG. 1.

Operation of the circuit 10 has been generally described above. FIG. 2 illustrates diagrammatically with more specificity on how DSP 30 processes the signals when circuit 10 is in operation.

It must first be understood that conventional cellular phones, as well as conventional telephones in general, normally feed back the near-side speech of a caller from the caller's microphone back into the caller's handset speaker. This is intended to allow the caller to hear truly duplexed conversation in the caller's handset speaker. This is usually accomplished by the creation by the conventional telephone circuitry of what is known in the art as a side-tone. As discussed previously, the side-tone disrupts communications because the scrambling/encryption and de-scrambling/decryption are performed with independent parameters. Therefore, if phone circuit generated side-tone were output to the speaker it would be no more than noise.

There can also be echoes produced by telephone networks, including cellular networks. In each case, any echo can be annoying or distracting, or even make communication difficult or unintelligible since it is scrambled and de-scrambled with different parameters. The side-tone is particularly a problem with circuit 10 because circuit 12, which is not changed by the addition of circuit 10, generates a side-tone from the scrambled near-side audio it receives at mic input 14, and returns the side-tone towards speaker 24 by outputting the side-tone at speaker output 16. Therefore, if allowed to go to speaker 24, the near-side caller would be given not only de-scrambled far-side audio, but also near-side side-tone which was generated in circuit 12 from the scrambled near-side audio at mic input 14, and then digitized, de-scrambled (using incorrect parameters), and converted to an analog signal along path 44, 30, and 46. This would be truly disruptive to understanding the far-side speech or efficiently or effectively speaking into microphone 18.

Therefore, DSP 30 can be programmed to deal with the problems with side-tones described above, as well as with other side-tones or echo problems. FIG. 2 represents the signal processing providing by DSP 30 and its programming. Various states of the signal are illustrated diagrammatically and given reference numerals, as are functional blocks.

Near-side audio is digitized and stored in memory in DSP 30. On the one hand, the digitized near-side audio (see 62/64 of FIG. 2) is scrambled, here for example by an inversion scrambling technique such as are known in the art (see 68). On the other hand, the digital representation of the near-side audio stored in DSP 30 (the "side-tone" 66) is sent to a software summer (see 70). Summer 70 sums the digital side-tone 66 with recovered, de-scrambled far-side audio 92 and thus creates a digital signal representing a combination (see 94) of recovered, de-scrambled far-side audio with unscrambled near-side side-tone 66 that can then be presented to DAC 46, amp 48 and near-side listener speaker 24 of FIG. 1. The near-side caller therefore well hear the far-side speech and his/her own speech, both unscrambled.

Echo problems are eliminated or reduced as follows. Scrambled near side audio 72/74 is output (see 74) to DAC 36 (FIG. 2) from DSP 30 for transmission over the cellular network to the far-side phone, but is also used (see 76) by adaptive echo canceler (AEC) software (see 86). Incoming digitized, scrambled far-side audio (78/80) contains not only scrambled far-side audio, but also scrambled side-tone, which is generated by phone circuitry 12, as explained above. Circuit 12 generates the near-side side-tone from what it receives at mic input 14 (see FIG. 1) which are side-tones scrambled by DSP 30. The side-tone generated by circuitry 12 is thus digitized along with far-side audio by ADC 44 (FIG. 1) and sent to DSP 30. The software of DSP 30 thus is given (a) digitized scrambled far-side audio plus digitized scrambled near-side side-tone (see FIG. 2 at 78 and 80). AEC 86 effectively functions to compare scrambled side-tones generated by circuit 12 and contained in the signal represented at 80 with scrambled side-tone (see 76) extracted from the scrambled signal represented at 72. AEC 86 looks for sections of the digitized code 80 and 76 that match, which would only be the scrambled side-tone, and then cancels both. The output of AEC 86 is therefore solely digitized scrambled far-side audio (see 88), without any side-tones. That digitized far-side audio is de-scrambled by DSP 30 (see, herein de-scrambler 90), the recovered far-side audio, still digital but de-scrambled (see 92), is then used by summer 70. As described previously, the digitized, unscrambled far-side audio (92) is combined with the digitized, never-scrambled side-tone (66) to present digitized, unscrambled far-side audio and near-side side-tone (see 94) to DAC 46 of FIG. 1. There would be no echo to the near-side caller and all information would be de scrambled with no disruption.

The method of adaptive echo cancellation can be such as is well known in the art. Examples can be found at "Digital Voice Echo Canceler With a TMS32020", Digital Signal Processing Applications, Volume 1 Texas Instruments, 1986, pp. 415–454 and "Digital Voice Echo Canceler Implementation on the TMS320C5x:, Telecommunications Applications with the TMS320C5x DSPs, Texas Instruments, 1994, pp. 189–201, both of which are incorporated by reference herein.

Options and Alternatives

It will be appreciated that the present invention can take many forms and embodiments. The true essence and spirit of this invention are defined in the appending claims, and it is not intended that the embodiment of the invention presented herein should limit the scope thereof.

For example, the embodiment described above is in the context of a audio scrambler, particularly one which uses inversion scrambling. Different types of such scramblers are commercially available and the methodology is well known in the art. One such inversion scrambler is available from the owner of this application under the trademark Crypto Voice Plus (CVP). A proprietary method of inversion scrambling is disclosed at U.S. Ser. No. 08/673,348 filed Jun. 28, 1996, which is owned by the owner of the present application, and is incorporated by reference herein.

The invention also will function with encryption, as opposed to scrambling technology. The DSP 30 would be appropriately programmed with encryption/decryption software. A wide variety of such programs and modules are available in the art, and the particular method of encryption (or scrambling) does not form the basis for the claims herein. Examples of possible encryption methods or modules can be seen at U.S. Pat. No. 3,962,539 issued Jun. 8, 1976, and incorporated by reference herein.

The embodiment is also described in the context of an after-market, add-on product. The invention can also be incorporated as an originally manufactured part of cellular phones, but its generic connection point, at the electroacoustical transducers of conventional cellular phones, provides a universal type aspect to the invention.

Not only can there be a power conservation feature with the invention, there can also be mode selection/verification which allows switching between utilizing the scrambling or encryption and not. This can easily be accomplished using known programming and mode selection methods. For example, a code entered from the telephone keyboard (such as the key sequence "*0#") could enable the operation of the scrambler or encryptor, and a code could disable it. An existing LED, for example the "lock/unlock" LED on most conventional cellular phones, could also function to indicate if the scrambler or encryptor circuit is enabled or not.

It is to be further understood that the software to operate the DSP can be written in assembly language or some higher level language. The precise coding is within the skill of those skilled in the art.

The above description deals primarily with conventional cellular phones. Recently digital phones have come out in the marketplace. While the present invention may not be ideally suited for digital phones in their digital mode, it is suited for digital phones operating in their analog mode.

What is claimed:

1. An apparatus for cellular telephone communications security comprising:
    a cellular telephone including a handset side comprising a microphone and a speaker and a telephone side comprising a cellular telephone circuit having a microphone input and a speaker output;
    a security circuit electrically connected between the handset side and the telephone side of the cellular telephone, the circuit comprising a first signal path between microphone and microphone input through an analog to digital converter, a digital signal processor, and a digital to analog converter, and a second signal path between speaker output and speaker through an analog to digital converter, a digital signal processor, and a digital to analog converter.

2. The apparatus of claim 1 wherein the cellular telephone includes electrical connections for the microphone, speaker, microphone input, and speaker input inside a housing, and the security circuit is contained on a single circuit board fitted into the housing.

3. The apparatus of claim 1 wherein the digital signal processor includes a memory having a security program loaded into the memory.

4. The apparatus of claim 3 wherein the security program is an audio scrambling program.

5. The apparatus of claim 4 wherein the security program is an encryption program.

6. The apparatus of claim 3 wherein the scrambling program is an inversion scrambling program.

7. The apparatus of claim 1 further comprising an automatic gain circuit operatively connected to the secured signal path to control the signal level in the second signal path.

8. The apparatus of claim 1 further comprising a power conservation circuit comprising a sensor of activity at the microphone, a power down circuit responsive to a signal from the sensor indicating no activity at the microphone.

9. The apparatus of claim 1 further comprising an adaptive echo cancellation circuit which removes side-tone added by the telephone circuit and adds to the speaker side-tone taken directly from the microphone.

10. The apparatus of claim 9 wherein the adaptive echo cancellation circuit comprises software programming stored on a memory associated with the digital signal processor, the software programming (a) storing a digital representation of audio entering the microphone in the form of a side-tone in said memory while simultaneously scrambling the digital representation and storing digital representation of scrambled audio, (b) sending the stored digital representation of audio directly to the speaker with any de-scrambled signal from the speaker output, and (c) comparing the stored digital representation of scrambled audio with any side-tone generated by the phone circuit, and canceling the side-tone generated by the phone circuit.

11. The apparatus of claim 1 wherein the cellular telephone is a digital telephone operating in an analog mode.

12. A method of cellular telephone communications security for cellular telephones having a handset side including a microphone and a speaker, and a telephone side including a telephone circuit that includes a microphone input, a speaker output and a side-tone generator sending a generated side-tone to the speaker output, comprising:
    intercepting unsecured analog output of the microphone of a cellular telephone, the unsecured analog output comprising near-side audio;
    sending the unsecured analog output to the speaker;
    securing the unsecured analog output from eavesdropping;
    using the secured analog output to cancel the side-tone generated by the telephone circuit;
    intercepting secured analog input of the speaker output of a cellular telephone, the analog input comprising secured far-side audio and secured telephone circuit generated side-tone;
    removing the secured side-tone from the analog input;
    unsecuring the secured far-side audio; and
    sending the unsecured far-side audio to the speaker.

13. The method of claim 12 wherein the step of removing the secured side-tone comprises of comparing the secured analog input with the secured analog output, including the telephone circuit generated side-tone with the secured far-side audio, matching the secured analog input with the telephone circuit generated side-tone, and separating and eliminating from the secured analog output the telephone circuit generated side-tone.

14. The method of claim 12 wherein the telephone circuit generated side-tone is removed by adaptive echo cancellation.

15. The method of claim 12 further comprising of eliminating echo from the analog output by adaptive echo cancellation.

16. The method of claim 12 wherein the step of securing the unsecured analog input and the far-side audio comprises scrambling, and the step of unsecuring the secured far side audio is de-scrambling.

17. The method of claim 12 wherein the step of securing the unsecured analog input and the far-side audio comprises encryption, and the step of unsecuring the secured far side audio is decryption.

18. The method of claim 12 wherein the cellular telephone is a digital telephone operating in an analog mode.

19. An apparatus for providing a level of voice privacy for cellular telephones having a telephone circuit which includes a microphone connected to a microphone input in the telephone circuit, a speaker connected to a speaker output in the telephone circuit, and a transceiver connected to the microphone input to transmit near-side audio from the microphone to the cellular network and connected to the speaker output to receive far-side audio from the cellular network and pass the far-side audio to the speaker, the telephone circuit including a side-tone generator which generates a side-tone based on the near-side audio at the microphone input and passes the generated side-tone to the speaker output, so that the speaker receives a combination of received far-side audio and side-tone, the improvement comprising:

a voice security circuit connected between the microphone and the microphone input of the telephone circuit and between the speaker output and the speaker of the telephone circuit;

the voice security circuit comprising a means for securing the near-side audio positioned between the microphone and the microphone input;

a means for unsecuring far-side audio positioned between the speaker output and the speaker;

a means for adaptively removing echo and the telephone generated side-tone positioned between the speaker output and the speaker.

20. The apparatus of claim 19 wherein the means for securing the near-side audio and the means for unsecuring far-side audio is a scrambler/de-scrambler.

21. The apparatus of claim 19 wherein the means for securing the near-side audio and the means for unsecuring far-side audio is an encryptor/decryptor.

22. The apparatus of claim 19 wherein the cellular telephone is a digital telephone operating in an analog mode.

23. A method of duplex voice communications security in a cellular telephone having a microphone, a speaker, a microphone input and a speaker output comprising:

electrically connecting a voice security module between the microphone and the microphone input of the cellular telephone; and connecting the voice security module between the speaker and the speaker output of the cellular telephone.

24. The method of claim 23 wherein near-side audio from the microphone is scrambled by the scrambling module and far-side audio, scrambled prior to transmission, is de-scrambled by the scrambling module.

25. The method of claim 24 further comprising providing unscrambled near-side audio in the form of side-tone to the speaker.

26. The method of claim 24 further comprising removing any scrambled near-side audio prior to passing the same to the speaker.

27. The method of claim 26 wherein the step of removing is accomplished by adaptive echo cancellation.

28. The method of claim 23 wherein the cellular telephone is a digital telephone operating in an analog mode.

* * * * *